United States Patent
Sarnowicz et al.

(10) Patent No.: US 7,730,068 B2
(45) Date of Patent: Jun. 1, 2010

(54) EXTENSIBLE DATA COLLECTORS

(75) Inventors: Maciek Sarnowicz, Redmond, WA (US); Praveen Seshadri, Bellevue, WA (US); Vipul M. Shah, Redmond, WA (US); James A. Holt, Issaquah, WA (US); Michiel J. Wories, Redmond, WA (US); Hongfei Guo, Redmond, WA (US); Ciprian Gerea, Seattle, WA (US); Daniel T. Jones, Sammamish, WA (US); Oscar G. Naim, Redmond, WA (US); Grigory Pogulsky, Redmond, WA (US); Sethu Srinivasan, Sammamish, WA (US); James K. Howey, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 316 days.

(21) Appl. No.: 11/535,375

(22) Filed: Sep. 26, 2006

(65) Prior Publication Data
US 2007/0288500 A1    Dec. 13, 2007

Related U.S. Application Data

(60) Provisional application No. 60/804,629, filed on Jun. 13, 2006, provisional application No. 60/804,634, filed on Jun. 13, 2006.

(51) Int. Cl.
    *G06F 7/00* (2006.01)
(52) U.S. Cl. .................................. 707/738; 707/758
(58) Field of Classification Search .................. None
    See application file for complete search history.

(56) References Cited

U.S. PATENT DOCUMENTS

| | | |
|---|---|---|
| 6,243,669 B1 | 6/2001 | Horiguchi et al. |
| 6,256,773 B1 | 7/2001 | Bowman-Amuah |
| 6,260,035 B1 | 7/2001 | Horvitz et al. |
| 6,356,865 B1 | 3/2002 | Franz et al. |
| 6,442,524 B1 | 8/2002 | Ecker et al. |
| 6,493,719 B1 | 12/2002 | Booth et al. |
| 6,601,233 B1 | 7/2003 | Underwood |
| 6,983,456 B2 | 1/2006 | Poznanovic et al. |
| 7,181,438 B1 | 2/2007 | Szabo |
| 7,487,173 B2* | 2/2009 | Medicke et al. ............ 707/102 |
| 2002/0083148 A1* | 6/2002 | Shaw et al. ................ 709/214 |
| 2002/0093527 A1 | 7/2002 | Sherlock |
| 2003/0061506 A1 | 3/2003 | Cooper |
| 2003/0130899 A1 | 7/2003 | Ferguson et al. |
| 2003/0229529 A1 | 12/2003 | Mui |
| 2004/0039942 A1 | 2/2004 | Cooper |

(Continued)

OTHER PUBLICATIONS

International Search Report dated Sep. 4, 2007 for PCT Application Serial No. PCT/US2007/003692, 3 pages.

(Continued)

*Primary Examiner*—Tim T. Vo
*Assistant Examiner*—Jau-Shya Meng
(74) *Attorney, Agent, or Firm*—Workman Nydegger

(57) ABSTRACT

Automated sampling and aggregation of performance or other dynamically varying data facilitates user productivity by making data available for a wide range of uses. An automated sampling and aggregation system includes one or more types of data collectors, including a dedicated data collector per machine, multiple data collectors per machine, or an instance-less data collector.

19 Claims, 12 Drawing Sheets

U.S. PATENT DOCUMENTS

| | | |
|---|---|---|
| 2004/0148586 A1 | 7/2004 | Gilboa |
| 2004/0230572 A1 | 11/2004 | Omoigui |
| 2004/0250112 A1 | 12/2004 | Valente |
| 2005/0086059 A1 | 4/2005 | Bennett |
| 2005/0086246 A1* | 4/2005 | Wood et al. .............. 707/101 |
| 2006/0074980 A1 | 4/2006 | Sarkar |
| 2006/0112299 A1 | 5/2006 | Urmston et al. |
| 2006/0184661 A1 | 8/2006 | Weisman |
| 2006/0184681 A1 | 8/2006 | Bernardi |
| 2006/0195424 A1* | 8/2006 | Wiest et al. ................ 707/3 |
| 2006/0265353 A1* | 11/2006 | Garg et al. ................. 707/2 |
| 2007/0093986 A1* | 4/2007 | Armstead et al. .......... 702/182 |

OTHER PUBLICATIONS

OA dated Dec. 16, 2008 for U.S. Appl. No. 11/535,358, 11 pages.
Office Action dated Jun. 30, 2008 cited in U.S. Appl. No. 11/535,358.
Office Action dated Jun. 25, 2009 cited in U.S. Appl. No. 11/535,358.

* cited by examiner

EXTENSIBLE DATA COLLECTORS

CROSS-REFERENCE TO RELATED APPLICATIONS

This application claims the benefit of U.S. Provisional Application Ser. No. 60/804,629, filed Jun. 13, 2006 entitled "EXTENSIBLE DATA COLLECTORS," the entirety of which is incorporated herein by reference. This application is also related to U.S. patent application Ser. No. 11/535,358 filed on Sep. 26, 2006, entitled "DECLARATIVE MANAGEMENT FRAMEWORK", which claims the benefit of U.S. Provisional Application Ser. No. 60/804,634, filed Jun. 13, 2006, entitled "DECLARATIVE MANAGEMENT FRAMEWORK". The entirety of each of these applications is incorporated herein by reference.

BACKGROUND

System administrators on a daily basis can manage databases or other servers that have a large number of installed applications. System administrators configure the databases or servers to meet various administrative goals or management policies, such as, providing the data in a recoverable format in preparation for a system failure. In addition, the system administrator should monitor the policies for updates, report on the state or health of the system (e.g., whether it is conforming to the desired policy), react when the system no longer conforms to the desired policy, as well as other actions.

In order to perform such actions, the system administrator translates policies into a set of detailed low-level actions that are utilized to configure the system. This requires significant knowledge of the options exposed by the installed applications and the details and semantics of the deployed applications since system administration is generally not easy and intuitive. The system administrator may establish separate monitoring and reporting mechanisms and, if automation is desired, it has to be established manually. The system administrator repeats this process individually for every target being managed, thus, there are no efficiencies of scale in management. This results in redundant time and effort being expended for each managed target. In addition, to ensure that a machine or system is performing as desired, a system administrator has to collect data from various sources, which can be time consuming and tedious.

Therefore, to overcome the aforementioned as well as other deficiencies, what is needed is automated sampling and aggregation of performance or other dynamically varying data to make such data available for a wide range of uses.

SUMMARY

The following presents a simplified summary in order to provide a basic understanding of some aspects of the disclosed embodiments. This summary is not an extensive overview and is intended to neither identify key or critical elements nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with providing a uniform platform for collecting data from a variety of sources. Such collected data can be utilized to monitor, troubleshoot and police instances of data management product services. The platform can be a base for a variety of tools.

In accordance with some embodiments, a data collector can be hosted in a service for continuous monitoring or in a stand-alone process for one-time ad-hoc data collection. A single data collector can monitor zero or more services or management targets. Each target is managed by one data collector and each target should be able to point to its data collector. A machine can have multiple data collectors. Each target can specify the location (e.g., connection string) for its data to persist. This location could be local (local repository), remote or empty (meaning no location is specified). If no location is specified, the collection can remain locally in flat files and the user can manage the flat files.

In accordance with some embodiments, there are out-of-box collections defined for well known types of management targets (for example, analysis services is a type of management target). A user can define additional collections for specific types of management targets or for a specific instance of a type.

The data collector can be deployed on a target and a remote client can communicate directly with the data collector for administration of data collections. For example, a user can start/stop collections or edit collections. A client should be able to obtain the latest data from the data collector's buffer directly from the data collector, even before this information becomes available in the repository.

If there are multiple data collectors on the same machine, some metrics' collection may be duplicated (e.g., collected by each collector). In this case, the duplication provides time correlation of data per collector. The data collector service, at both install time and run-time, might not depend upon installation of another service. For example, the data collector can be installed on a machine with no relational engine.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
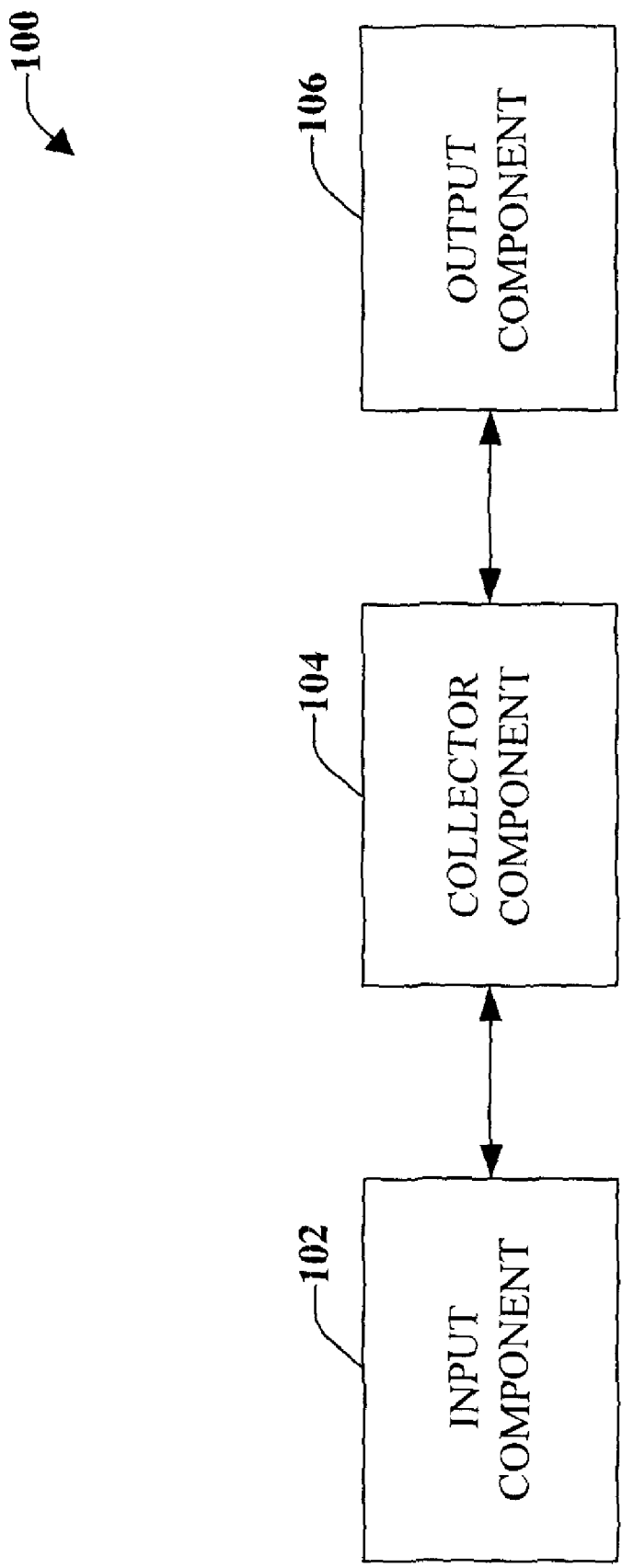
FIG. 1 illustrates a high-level block diagram of system that facilitates data collection.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Any reference to memory, storage, database, or other medium as used herein can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

As used herein, the terms to "infer" or "inference" refer generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In the following detailed description, various aspects and embodiments may be described in the context of a SQL Server. While these inventive aspects may be well suited for use with the disclosed embodiments, those skilled in the art will readily appreciate that these inventive aspects are likewise applicable for use in various other data management produces. Accordingly, any reference to an SQL Server is intended only to illustrate the inventive aspects, with the understanding that such inventive aspects have a wide range of applications.

FIG. 1 illustrates a high-level block diagram of system 100 that facilitates data collection. System 100 includes an input component 102, a collection component 104, and an output component 106. Although a number of input component(s) 102, collection component(s) 104, and output component(s) 106 can be included in system 100, as will be appreciated, a single input component 102 that provides information to a single collection component 104 that can be presented to a user though a single output component 106 is illustrated for purposes of simplicity.

Input component 102 can be configured to receive an input from a user and/or entity (e.g., the Internet, another system, a computer, . . . ). The input component 102 can receive a service (e.g., management target) requested by a user, data to be monitored, reported, evaluated, etc. or other input information. The user can also employ input component 102 to both start and stop collections or to edit collections. Input component 102 can be located remote from collection component 104 allowing collection component 104 to be deployed remotely.

The input component 102 can provide various types of user interfaces. For example, input component 102 can provide a graphical user interface (GUI), a command line interface, a speech interface, a Natural Language text interface, and the like. For example, a GUI can be rendered that provides a user with a region or means to load, import, select, read, etc. a service, data, etc, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance, such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message or producing an audio tone. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Collection component 104 can be hosted in a service that provides scheduling capabilities and can be configured to monitor zero or more services, which can be a target. Collection component 104 can sample and aggregate input information. It should be noted that each target is managed by one collection component 104 and the target should be able to point to its collection component 104. Collection component 104 can sample and aggregate performance or other dynamically varying data (e.g., received from input component 102) and make such data available through output component 106, which can present the data in various formats (e.g., display screen, print, reporting, monitoring, and so on). Collection component 104 can perform continuous monitoring or monitoring on a one-time ad-hoc basis.

Figure 2:
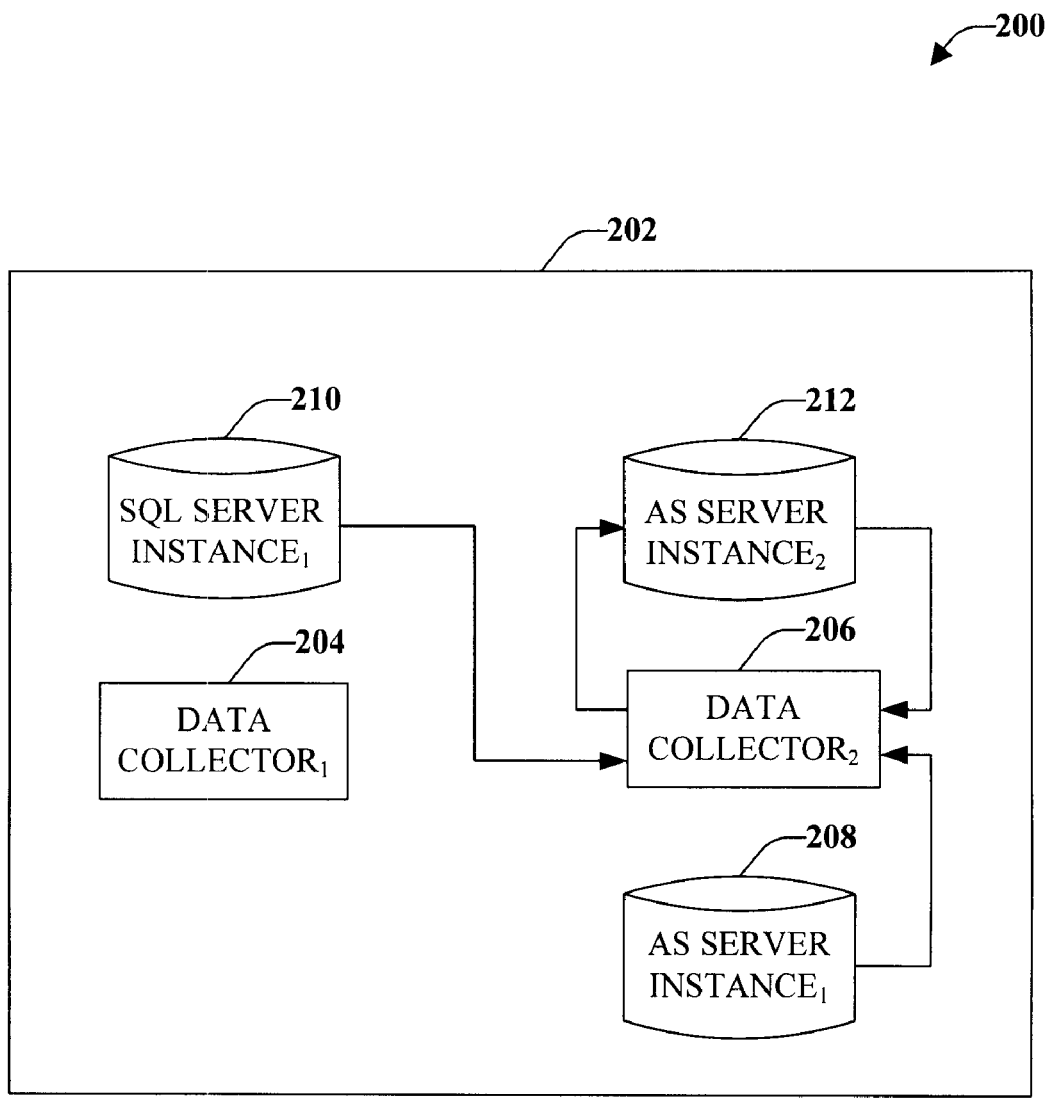
FIG. 2 illustrates a system that provides a dedicated data collector per machine.

FIG. 2 illustrates a system 200 that provides a dedicated data collector per machine 202. System 200 can monitor the targets on the machine 202 utilizing the dedicated data collector. System 200 includes a data collector$_1$ 204 and a data collector$_2$ 206. Data collector$_2$ is dedicated to machine 202. Monitoring of data collector$_2$ 206 can be performed by an AS Server Instance$_1$ 208, an SQL Server Instance$_1$ 210, and an SQL Server Instance$_2$ 212. The data can be stored in a relational engine instance, such as SQL Server Instance$_2$ 210. The location of the storage can be on a different instance, 206 or 208, or on a remote instance.

Figure 3:
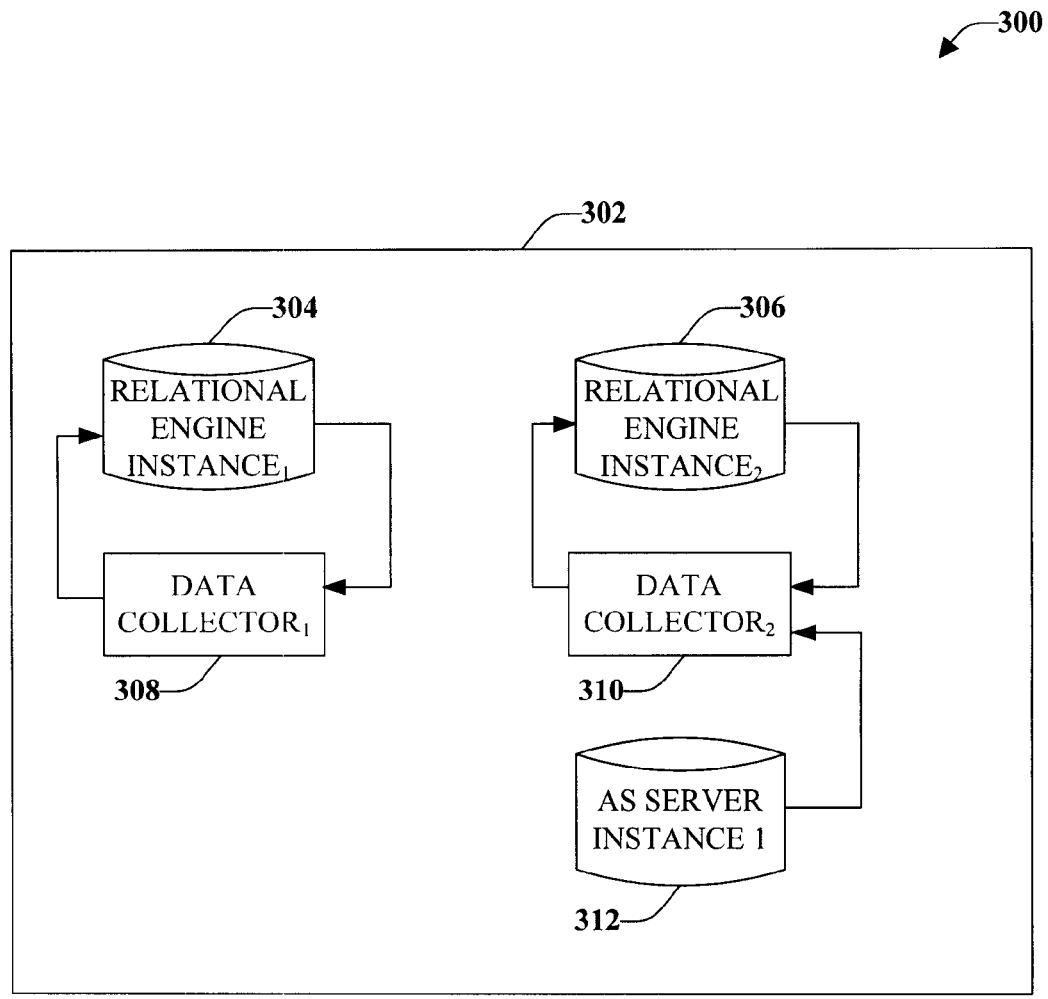
FIG. 3 illustrates a system that provides multiple data collectors per machine

FIG. 3 illustrates a system 300 that provides multiple data collectors per machine 302. In some embodiments, data collectors on a machine 302 can be utilized, for example, if instances should be completely separated for security or maintenance reasons. In these embodiments, each relational engine instance (e.g. relational engine instance$_1$ 304 and relational engine instance$_2$ 306) operates with a corresponding data collector (e.g., data collector$_1$ 308, data collector$_2$ 310). Each data collector 308 and 310 monitors its corresponding instance (Management Target) and stores data back to the same instance. For management targets other than Relational Engine (e.g., Analysis Services service), a dedicated data collector can be provided that monitors each target. An AS Server Instance$_1$ 312 can monitor data collector$_2$ 310.

Figure 4:
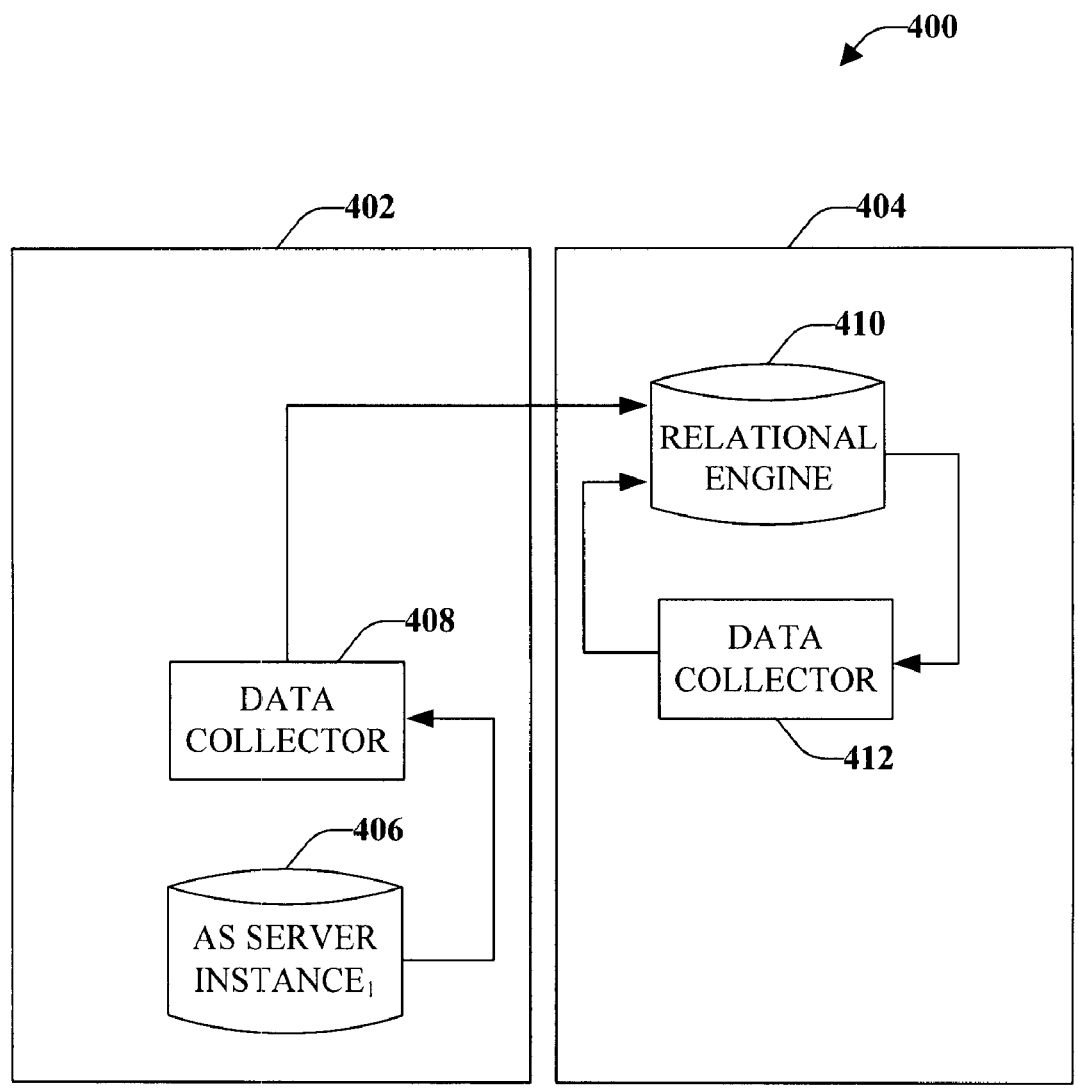
FIG. 4 illustrates a system that provides an instance-less data collector.

FIG. 4 illustrates a system 400 that provides an instance-less data collector. System 400 can be utilized when there is no Relational Engine installed on the machine, and therefore, there might not be a service that hosts a data collector. In such embodiments, an instance-less version of a data collector can be deployed. System 400 can run without a corresponding Relational Engine, and a data collector for that machine can be hosted. Data collected by that instance can be stored to a remote Relational Engine, which can be a Management Target of another data collector.

Illustrated are a first machine 402 and a second machine 404. First machine 402 includes an AS Server Instance$_1$ 406 that monitors a stand-alone data collector 408. The information from data collector 408 can be stored in a relational engine 410 on the second machine 404 (e.g. a remote relational engine). Relational engine 410 can monitor an data collector 412 on the second machine. The data from data collector 412 can be stored in relational engine 410.

Figure 5:
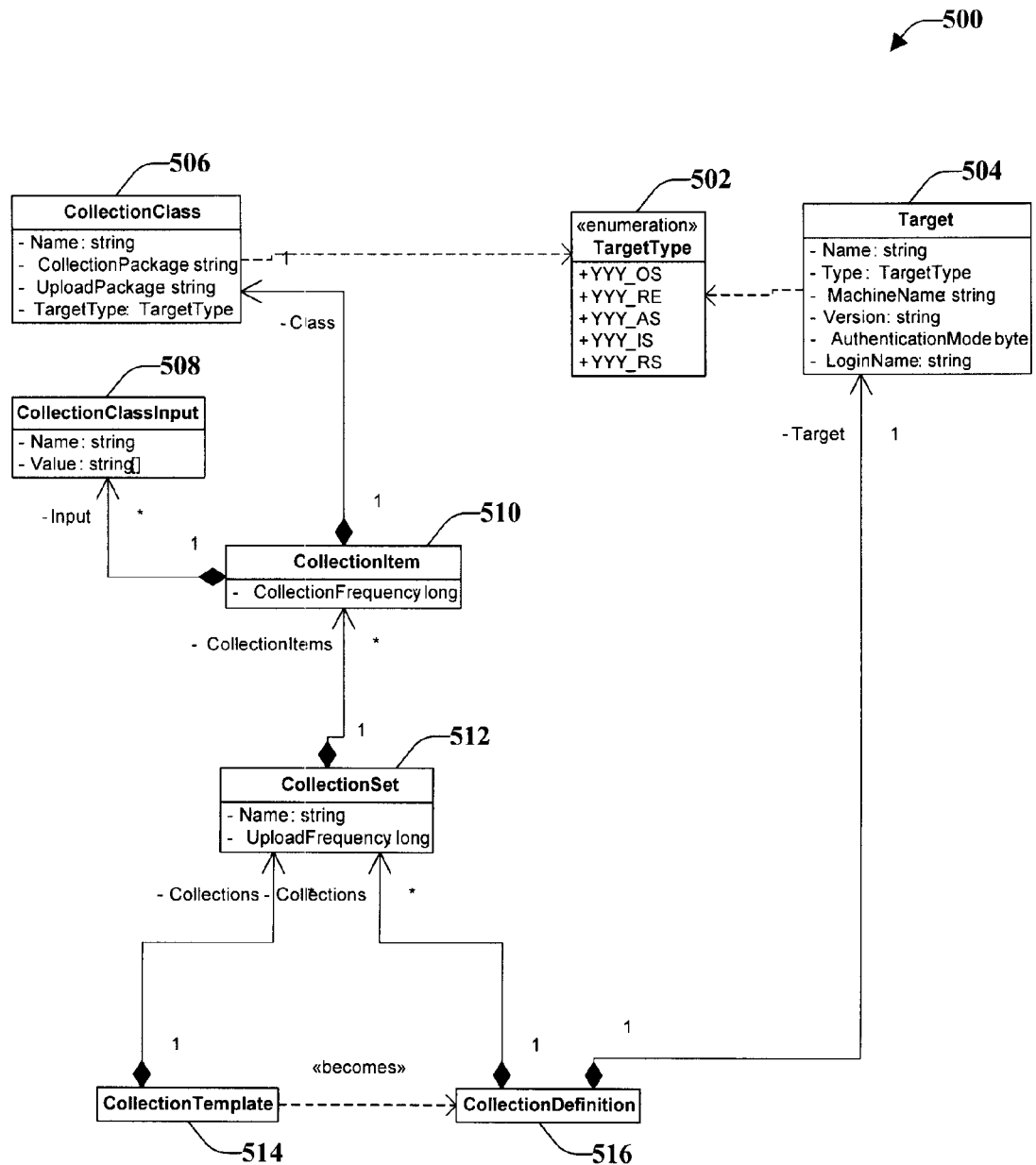
FIG. 5 illustrates exemplary entities that can be used to define and configure a data collection.

FIG. 5 illustrates exemplary entities 500 that can be used to define and configure a data collection. It should be understood that there could be more or fewer entities then those shown and described. The purpose of a data collector is to collect data. A target type 502 can enumerate the known target types to which a data collector system can connect and from which the data collector system can collect data. Target types 502 can be referenced in other classes. A generic target type (e.g., YYY_OS) can be used to identify data collected directly from operating system sources, such as performance counters, even log, file system, and so on.

A target entity 504 can define a single management target. Such target entity 504 can encapsulate the information that should be used to identify the target. Such information can include the target name, machine name, type, version, and so on. Information used to connect to the target (e.g., authentication mode, login name, password, and the like) can also be included in target entity 504. A list of targets on a machine can be constructed when a data collector system is installed. The data collector system can be refreshed or updated at any time.

A collection class entity 506 defines a collection for a target type and a target version. The collection class entity 506 can point to a package that is used for collecting the data. The collection class entity 506 can also point to the package that transforms and loads the data into a performance warehouse. The collected data points can be accessible to the upload package so that transformations can occur prior to the upload. At substantially the same time as update, the cache of collected data points can be cleared. The performance warehouse can have the data points as uploaded by the upload package.

The collection class 506 does not need to know anything specific about the target other than the target type. The configuration information can be defined later when the collection class 506 is instantiated and applied to the specific target. However, the collection class 506 should know the schema into which it uploads the data. The collection classes can be defined for default collections and by designers or developers for extensions.

A collection class input 508 can be a generalized interface for specifying the input, although the collection package for each class can include a specific set of inputs. Each collection class input 508 element can define a name of the input and one or more values. Each collection class entity can accept a vector of collection class input 508 elements.

A collection item 510 can bind the collection class and a vector of the collection call input elements together. By binding them together, the user can request a type of collection (the collection class) and that certain data points should be collected (collection class input). The collection item 510 can specify collection frequency, which is a sampling frequency that the collection will use. The collection frequency can be an optional attribute. If a collection frequency is not specified, it can indicate that the system either stops collecting data autonomously or it stops collecting data when it receives a signal to stop from the data collector.

A collection set 512 is a group of collection item entities that are logically related and should be collected together. The data collected by the collection set should be uploaded to the data warehouse as one set at the same schedule. The collections items within a collection set can be of different collection classes and can have inputs specific for those types. A collection set 512 can be scheduled and controlled as one entity and the data collected by the set can be correlated based on time (e.g., time of collection and time of upload).

The collection set 512 can define an optional upload frequency that specifies how often the data collected by each collection item is uploaded to a storage media. If upload frequency is not defined, it indicates that the data is uploaded once when the collection is finished. For example, this can happen when there is no collection frequency defined and can be used for on-demand collections. If the upload frequency is less often than a collection frequency, data can be cached in the data collector for the interval between uploads.

A collection template 514 is a set of collection set entities for a given target type and can be used to bind collections for every managed target. Collection templates 514 can be defined and installed with a data collector. Additional templates can be added by the user. There can be one template per target type, however, there are no restrictions to the number of templates that can be utilized per target. At startup, the data collector can bind all templates of a particular target type to each discovered target of that type and generate a consolidated collection definition per discovered target. The following illustrates an exemplary collection template for a SQL Server Relational Engine.

```
Collection Set: Name = "Base Performance Data"
   Collection Item: Class Name = "SQL_RE_Active_Requests_History"
      Collection Frequency: 1 second
   Collection Item: Class Name = "SQL_RE_Wait_Statistics"
      Collection Frequency: 15 seconds
   Collection Item: Class Name = "SQL_RE_Performance_Counters"
      Input: Counter - Locks: Current Latch Waits
      ...
      Collection Frequency: 15 seconds
   Collection Item: Class Name = "WIN_OS_Performance_Counters"
      Input: Counter - Process: % Processor Time
      ...
      Collection Frequency: 15 seconds
   Upload Frequency: 30 minutes
Collection Set: Name = "Server Configuration Data"
   Collection Item: Class Name = "SQL_RE_TSQL"
      Input: T-SQL query for database sizes
      Collection Frequency: <none>
   Collection Item: Class Name = "SQL_RE_TSQL"
      Input: T-SQL query for configuration options
      Collection Frequency: <none>
   Upload Frequency: 24 hours
```

A collection definition 516 is an entity that is directly used by the data collector. The collection definition 516 drives the collection and is created from a collection template by applying it to a specific management target. At startup, the data collection can bind all templates of a particular target type to each discovered target of that type and generate a consolidated collection definition per discovered target. Collection definition 516 can be customized by the user and the collection and upload frequencies can be changed. However, if the user wants to add or remove collection sets, the user should generate a new template and apply it to the target.

Data collection configuration can be persisted in one at least two ways in a relation engine schema and in an XML file. If in a relational engine schema, the data collection should be the default storage when collector is running in service mode and there is relational engine instance available. Storing a collection definition in a relational schema allows granular security to be applied to each collection set and also to replicate the definitions across machines.

An XML file is a storage option when the collector is operating on a machine where there is no relational engine available. Another scenario can be if the collector runtime is outside of a service, such as, for example, as a stand-alone application and a simple snapshot of some data is desired. A new collection definition can be created just for that instance and passed to the collector. This can be used in place of the main collection definition stored in relational engine schema.

The data collector can communicate with the storage through an abstracted interface that allows it to obtain the collection definition regardless of where it is stored. There are two concrete implementations of the storage—one for RE schema and one for XML file.

The data collector runtime instantiates the right storage interface based on the parameter passed at start time. The parameter can include a connection string to the storage as well (that being a file name or a connection string to the database).

Figure 6:
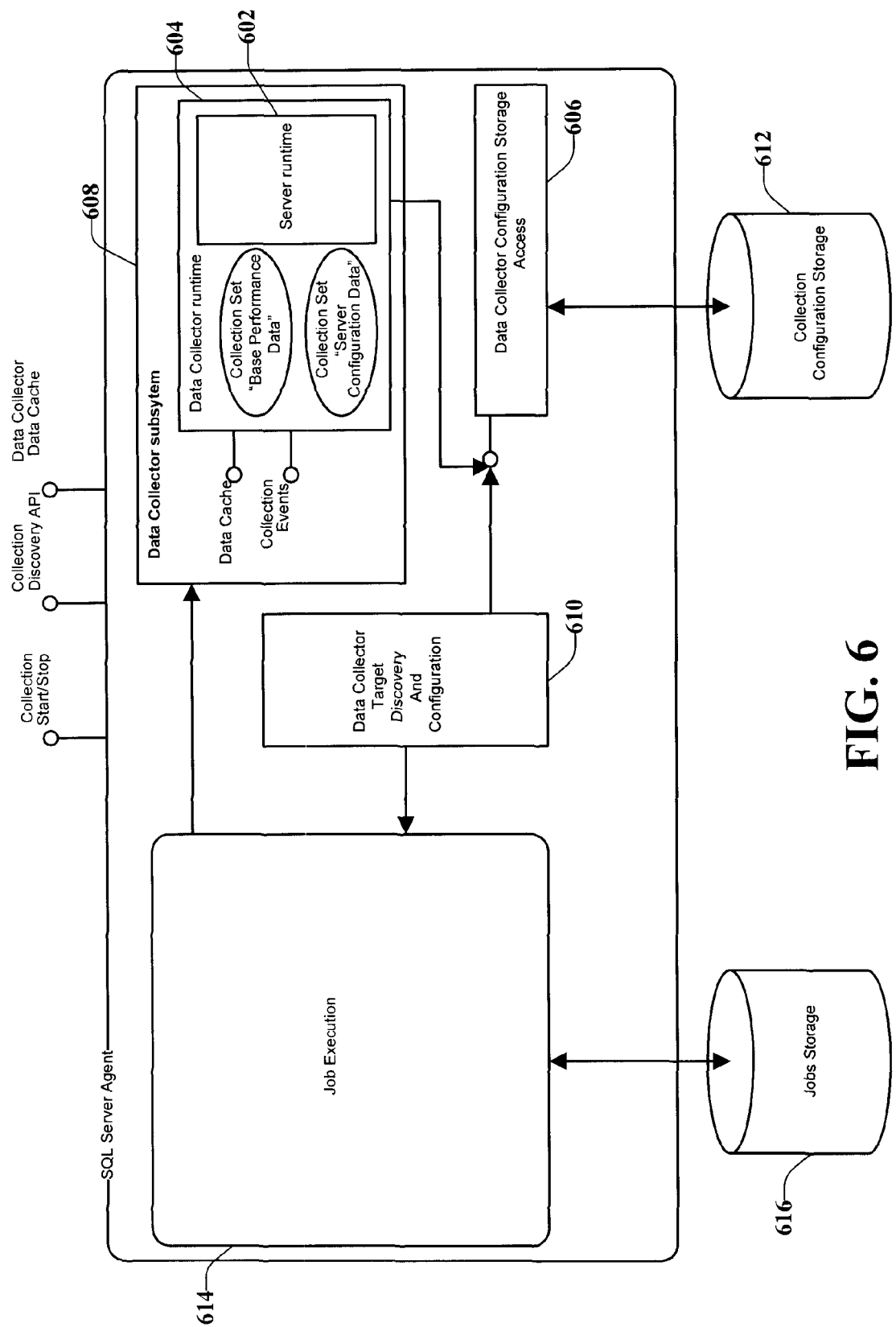
FIG. 6 illustrates a top-level view of exemplary architectural components.

FIG. 6 illustrates a top-level view of exemplary architectural components. Architectural components include an SSIS runtime 602, a data collector runtime 604, a data collector configuration storage access 606, a data collector subsystem 608, a data collector target discovery and configuration 610, and data collection management objects.

A data collector can be based on server runtime 602 allowing the individual collector packages to be packages that run within server runtime 602 and can utilize many data sources, destinations, transformations and tasks. They can also be modified or extended by a user and new packages can be developed by using a designer (e.g., in Visual Studio), and adding such modifications to the data collector. The server runtime 602 can be hosted inside the data collector runtime 604 or invoked through out-of-process execution using DTExec utility, for example.

The data collector runtime component 604 can be part of the data collector and can be hosted by any process. The data collector runtime component 604 operates the data collection and the unit of execution that the runtime understands can be referred to as a collection set. Collection sets can be, for example, "Base Performance Data", "Server Configuration Data", and so on. The runtime can accept any collection set as an input, load the packages that are part of the collection set and run them. The data collection runtime can run a collection set in one of at least two modes: a run-once and a run continuously. Run-once refers to starting the packages allowing it to run until they complete, then unloaded from memory. Run continuously allows the package to run until it is signaled to exit. The package is triggered to execute an iteration by the runtime.

The data collector can provide various services to the collection sets. For example, it can provide a data cache mechanism that can be utilized by any collection package. The data collector can provide an external interface to access the data cache. The interface can be used by a component hosting the data collector runtime to retrieve the cached data. Further, the data collector can provide data collection events to which components outside of the runtime can subscribe. The events can allow running some actions at substantially the same time as collection. A use for this mechanism can be policy evaluation.

Data collector configuration storage access 606 is a component that provides a storage mechanism for data collector configuration. It can receive a collection set definition and a collection discovery API from the data collector runtime 604. It can also receive collection sets from a data collector target discovery and configuration component 610. In addition data collector configuration storage access can retrieve from (and send to) a collection configuration storage 612 collection set definition. The collection configuration storage 612 can maintain the collection set definition in a retrievable format.

The actual implementation can be deployed utilizing various means including a relational engine storage or XML files, but it should be transparent to the other component of data collector. The data collector configuration storage access component 606 can provide an API that can be used to add and remove collection items and collection sets. APIs facilitate building software applications through a set of routines, protocols, and tools, wherein developers and/or programmers can employ the API to construct customized applications consistent with the operating environment and a user(s)

needs. Employing common APIs reduces learning curves and enables developers and/or programmers to focus on business needs.

Data collector subsystem 608 hosts data collector runtime 604 and provides linking between the runtime and the SQL Agent services such as job scheduling and execution component 614 that can retrieve from a job storage component 616 stored jobs. Data collector subsystem 608 can receive requests from job execution component 614 to start and stop collection job steps. Data collector subsystem 608 allows for the creation of SQL Agent jobs with job steps that can execute data collector collection sets. Jobs can be scheduled using regular SQL Agent scheduling mechanism. The data collector subsystem 608 can be a SQL Agent subsystem or another system that can host the runtime.

When a job that contains a data collector job step is run, data collector subsystem 608 requests the data collector runtime 604 to load and run a collection set. For collections that run continuously, the subsystem can stop such collection when the job is stopped. In addition, data collector subsystem 608 exposes the runtime data cache interface to external client processes. Finally, the subsystem allows the collector runtime to use a logging mechanism.

Data collector target discovery and configuration component 610 is another component of data collector that can be tied to a data collector infrastructure, however it has different role than the subsystem just described. Data collector target discovery and configuration component 610 has at least two tasks, namely to provide a mechanism that discovers management targets available on the machine and to provide a mechanism that takes a collection definition that consists of a group of collection sets and generates a series of jobs that can be run against a specific management target and on a specific schedule.

Data collector target discovery and configuration component 610 allows jobs to be built or created based on collection definition and sends a request to job execution component 612 to create a job(s). This process can be performed when SQL Agent starts or anytime during its lifecycle, such as when data collection configuration changes and SQL Agent jobs need to be refreshed. Exemplary rules for creating jobs are as follows: First, collections from different collection sets are executed through separate jobs. Then, collections that run on frequency less than fifteen minutes, for example, are scheduled as jobs that start at SQL Agent start up and run all the time. Execution of those collections can be controlled through internal loop that is part of data collector runtime. Then all other collections are scheduled as regular SQL Agent jobs using an agent schedule that matches the frequency defined in collection set. The actual time of execution can be customized by a user. If collection frequencies and upload frequencies for a collection set are different, there are two jobs created for the collection set. One job can execute the collection packages of the set, the other one executes upload packages of the set. Next, collection sets that do not have collection frequency or upload frequency defined are created without any schedule. Such collection sets can be run on-demand when requested by a user or client application.

The collection template defined above can be converted to following exemplary SQL Agent jobs:

Job 1, Name: "Base Performance Data Collection"
  Category: "Data Collector"
  Management Target: SQL_RE, "server\inst1"
  Job Step 1: Data Collector subsystem -continued Collection Set: Name = "Base Performance Data"
    Collection Mode: Collection Only, Continuous Run
  Schedule: At Agent start-up
Job 2, Name: "Base Performance Data Upload"
  Category: "Data Collector"
  Management Target: SQL_RE, "server\inst1"
  Job Step 1: Data Collector subsystem
    Collection Set: Name = "Base Performance Data"
    Collection Mode: Upload Only, Single Run
  Schedule: Every 30 minutes, Starting at 12:00 AM
Job 3, Name = "Server Configuration Data"
  Category = "Data Collector"
  Management Target = SQL_RE, "server\inst1"
  Job Step 1, Data Collector subsystem
    Collection Set, Name = "Server Configuration Data"
    Collection Mode: Collection and Upload, Single Run
  Schedule: Every Day at 12:00 AM Data collection management objects can be a managed API that can be included under a client-side API that can be used to configure data collection. The API can provide a client-side access to data collector and allows manipulating collection sets and collection definitions users can use this API to configure collections and it internally triggers creation of the right set of agent jobs through the data collector target discovery and configuration component 610. Users can still see the individual jobs, but this API provides a simplified means to manage collections.

Figure 7:
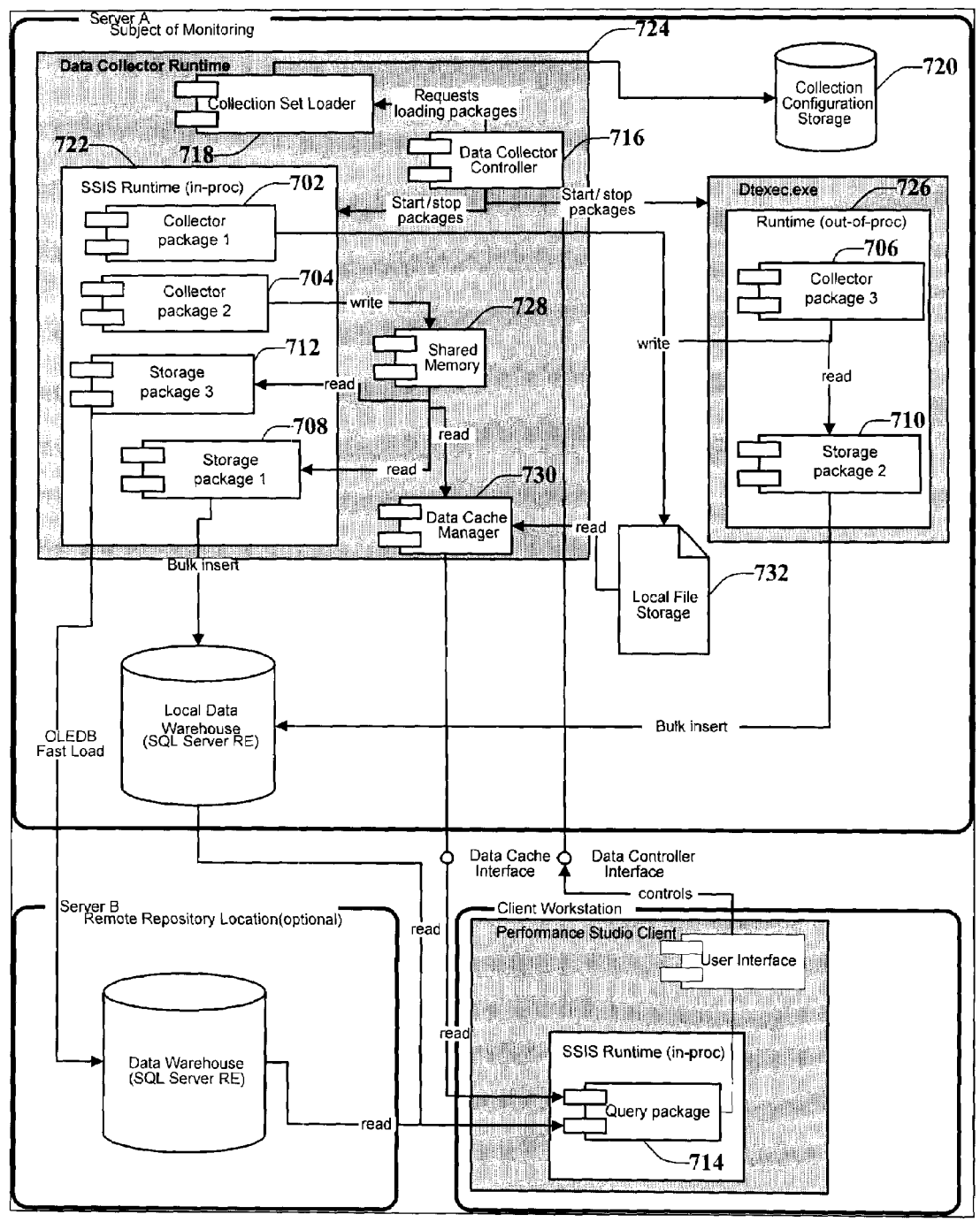
FIG. 7 illustrates a detailed view of a data collector runtime.

FIG. 7 illustrates a detailed view of a data collector runtime similar to the one illustrated in the above figure. The design can use packages to create data collector components. The packages can be divided into three categories: collection packages, upload packages, and query packages.

Collection packages are those packages that connect to various data sources and collect information. The data can be either pushed and processed through a pipeline or the package uses another service or component to start collection and only monitors its progress. An example of the former is collecting data from Dynamic Management View, for example, and of the latter is SQL trace data. Data collector package can cache data in shared memory region or in a file, depending on its needs. These packages are collector package 1 (e.g. SQL trace) 702, collector package 2 (e.g., wait statistics) 704, and collector package 3 (e.g., SAP Data) 706.

Upload packages are responsible for aggregating and filtering data and uploading it to a storage (data warehouse). The package works on data already collected by a collector package and can retrieve data from one of at least three sources. First, it can retrieve data directly from a package output, such as from another package. In this case, the storage package executes the data collector package and gets data directly. Secondly, it can retrieve data from shared memory when running in-proc with data collector package. In this case, the collector and the storage packages run in parallel. The storage package can be launched either on fixed schedule, or can be launches from the collector package when data starts to outgrow the shared memory cache. In addition, it can retrieve data from a local file, such as when running out-of-proc with data collector. This is a scenario similar to shared memory, except a file is used to exchange data. This can be used when running third-party packages that should not execute in-proc and have access to shared memory.

The storage package uploads data either using BULK INSERT command, or using OLEDB Fast Load interface. The bulk insert method is used for uploading to a local storage, and the fast load is used to uploading to remote storage. In most cases either one of the two methods can be used, but not two at the same time. However, the architecture does not prohibit such a scenario (uploading data to two or more repositories). These packages are storage package 1 (e.g., shared memory, local storage) 708, storage package 2 (e.g., package output, storage) 710, and storage package 3 (e.g., shared memory, remote storage) 712.

Query packages are those packages that run on the client and provide data to client application. Client executes the package on demand to obtain the data. The client can be an operating system application or a report. The package queries data from at least two sources, a data warehouse repository, using regular T-SQL queries and data collector data cache. Data from both sources can be merged in the query package and further aggregated or transformed to present it in a shape required by the client. This package can be query package 714. Query package 714 can retrieve data from a warehouse (e.g., historical data) and from a web service (real-time data) and aggregate the data together to be presented in a user interface (e.g., output component).

A data collector controller 716 can be accessible through an external interface. The interface allows the data collector controller to perform various functions, such as to start executing a collection set, to stop executing a collection set or to enumerate a currently running collection set. Starting to execute a collection set can take the following arguments: Collection Set name; and Collection Mode (Continuous run or Single Run; Upload only; Collection only; Collection and Upload).

When a collection set execution is requested, the controller asks collection set loader to load information about the collection set into memory. This includes information about all collections items their input and collection frequency and all SSIS packages that define collection classes. After that, the controller decides how to run SSIS packages based on the collection mode.

For collection, the collection packages are picked from the Collection set and passed to run in SSIS runtime. For upload, the upload packages are picked from collection set and passed to run in SSIS runtime. For collection and upload, (combination of the two above), collection packages are run first and uploaded after them. For continuous run, packages are run in a loop that is "triggered" with a frequency specified in the collection set (collection frequency or upload frequency). This can be performed for packages that need to be triggered more often than a predetermined amount of time (e.g. fifteen minutes). Those packages run until the collection set is requested to stop. For a single run, packages are run in one step and allowed to finish and exit.

Data collector controller can also provide synchronization objects that are used by packages to obtain access to shared resources. Names of synchronization objects are passed to the package before it starts execution. Data collector runtime can also configure all package variables, such as connection strings before packages are started.

Collection set loader 718 can communicate with collection configuration storage 720 and retrieve information about collection sets, including list of collection items, collection and upload frequencies and input for all collection items.

SSIS runtime (in-proc) 722 can be internally hosted by data collector runtime 724. The SSIS runtime can be used to execute individual packages. The in-proc execution provides the ability to run packages in the same address space and exchange data between them in an efficient manner through memory buffers (e.g., shared memory). In view of security implications, only certain packages should be executed in that subsystem.

Dtexec and SSIS runtime (out-of-proc) 726 can be an existing SQL server agent SSIS subsystem that allows any SSIS package to be run in out-of-proc fashion. Each executing package should have its own process and run independently from others. Once the package completes its work, the process exists and status is reported back to the SQL Agent. Any external (e.g., third-party) or modified package should be executed in this mode.

Shared memory 728 can include shared memory buffers that can be used by any package to temporarily store (cache) data retrieved by a collector package. An SSIS pipeline component can be used in any package to access those memory buffers, either to read or write data from them. The SSIS pipeline component can provide synchronized access to memory and also allocate new buffers as needed. Shared memory 728 can store the most recent history of data before such data is pushed to a repository.

Data cache access component 730 provides a mechanism to expose data collected and cached locally. The service provides methods that can be used to retrieve data. The data can be retrieved from at least two sources, shared memory buffers or local files created by collector packages. For the client it is transparent where the data is coming from. Data cache manager 730 can provide access to temporary stored data to clients from other machines. A way to reference the desired piece of data can be through an XPath-like query that uses collection definition and collection set names as parts of the XPath. For example to obtain data from Fact Table collection on machine TargetA a client can use the following query

---

Server[@Name='TargetA']/Collection Definition/Collection Set[@Name='Fact Table']

---

By separating the data collector runtime from the remaining components of the SQL Agent infrastructure and scheduling mechanism, the runtime can be re-used outside of the SQL Agent. The runtime can be hosted in other applications to support different scenarios. For example, a client process may use data collector runtime to perform one-time, on-demand data collection. A collection set specification and a target name should be provided. This mode can be utilized in applications like BPA or Upgrade Advisor or Setup.

Before data is collected, the targets should be discovered, their types known as well as, their version and their unique identity. This knowledge can be utilized to bind collections specific to that target. A management target discovery step can be provided that results in a list of targets to be monitored.

Local file storage 732 can provide a temporary local storage is a data warehouse is not available locally. Local file storage 732 may serve as natural storage for some collectors (e.g., trace).

Figure 8:
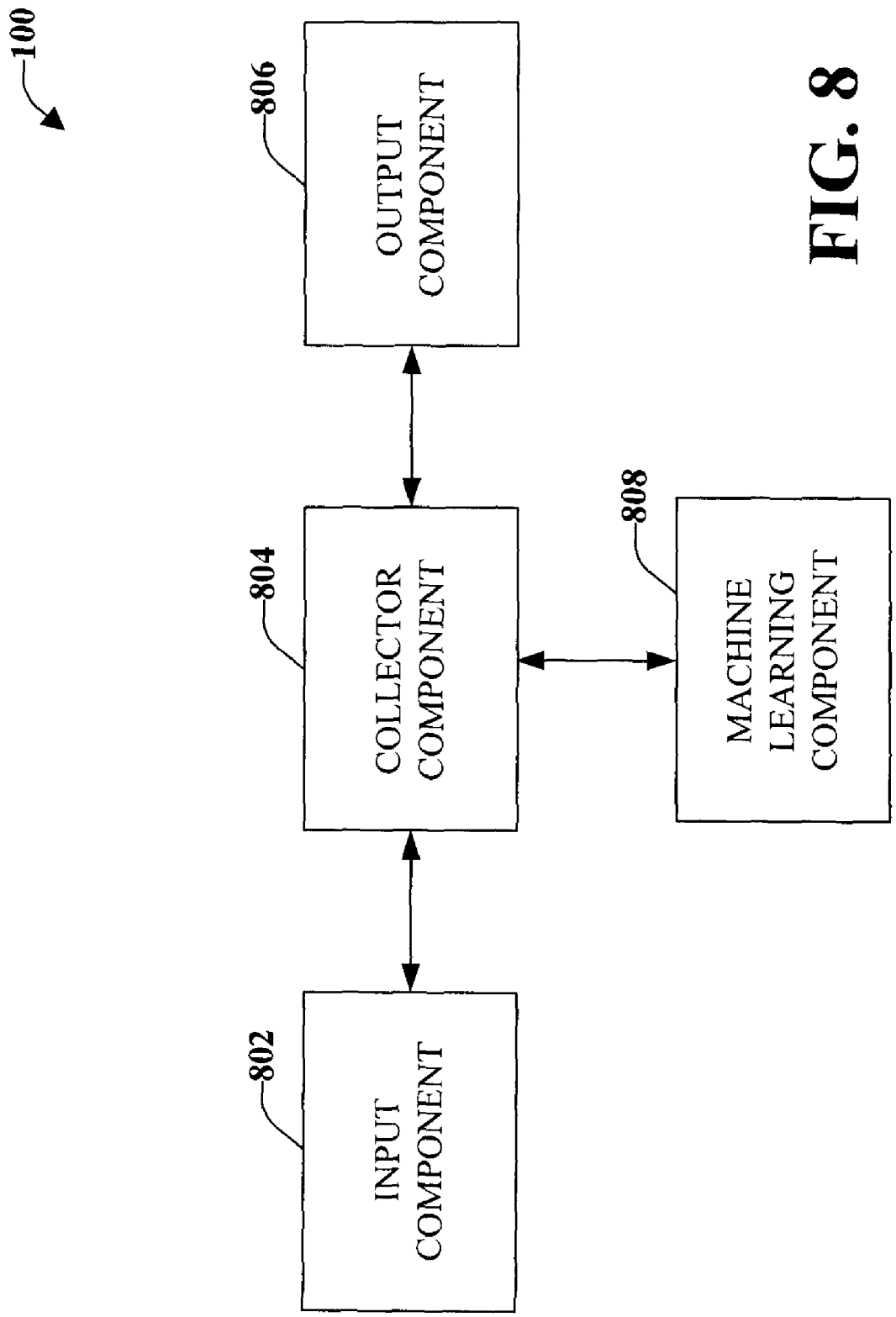
FIG. 8 illustrates a system that employs machine learning, which facilitates automating one or more features in accordance with the one or more embodiments.

FIG. 8 illustrates a system 800 that employs machine learning, which facilitates automating one or more features in accordance with the disclosed embodiments. System 800 includes an input component 802, a collection component 804, an output component 806, and a machine-learning component 808. A user can input various settings, policies, goals, or intents though interaction with the input component 802. This information is communicated to collection component 804 that interfaces with machine learning component 808 to dynamically collect data.

System 800 can employ various machine learning schemes for carrying out various aspects. In accordance with some embodiments, artificial intelligence can be utilized. Artificial intelligence based systems (e.g., explicitly and/or implicitly trained classifiers) can be employed in connection with performing inference and/or probabilistic determinations and/or statistical-based determinations as in accordance with one or more aspects as described herein. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

For example, an artificial process for collecting disparate types of data can be facilitated through an automatic classifier system and process (e.g., artificial intelligence component). Moreover, where multiple types of data are requesting having the same or similar resources, the classifier can be employed to determine which data to collect in a particular situation.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to infer an action that a user desires to be automatically performed. In the case of database systems, for example, attributes can be words or phrases or other data-specific attributes derived from the words (e.g., database tables, the presence of key terms), and the classes are categories or areas of interest (e.g., levels of priorities).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g. through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to configure a policy or target, which stored policies to execute, etc. The criteria can include, but is not limited to, the amount of data or applications to modify, the type of policy or target, the importance of the policy or target, etc..

In accordance with some embodiments, machine-learning component 808 can utilize a rules-based logic scheme. In accordance with this embodiment, an implementation scheme (e.g., rule) can be applied to control and/or regulate data collection within a database or system. It will be appreciated that the rules-based implementation can automatically and/or dynamically regulate policies or target sets based upon a predefined criterion. In response thereto, the rule-based implementation can allow, deny, and/or change a particular policy by employing a predefined and/or programmed rule(s) based upon any desired criteria (e.g. policy or target type, policy or target size, policy or target importance, database owner, user identity . . . ).

By way of example, a user can establish a rule that can require a trustworthy flag and/or certificate to access a predefined type of resource whereas, other resources within a particular database may not require such security credentials. It is to be appreciated that any preference can be effected through pre-defined or pre-programmed in the form of a rule.

Figure 9:
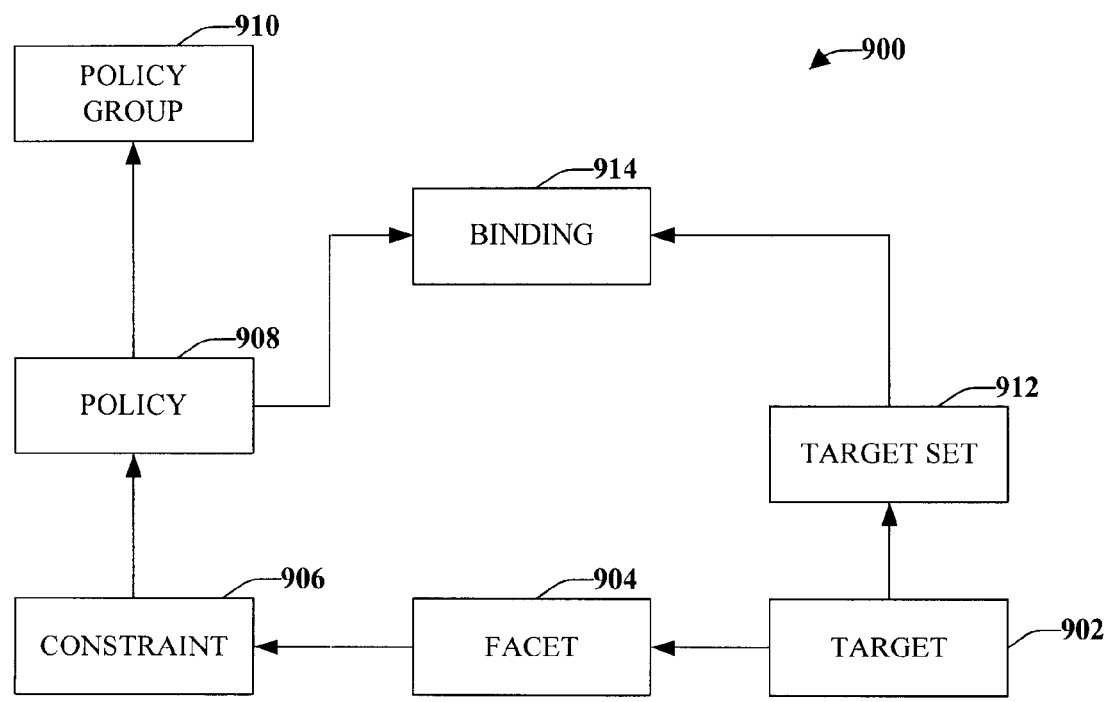
FIG. 9 illustrates a high-level block diagram of a system architecture.

Referring to FIG. 9, illustrated is a high-level block diagram of a system architecture 900. A database or system administrator (hereinafter referred to as user) is generally responsible for providing continuing correct operation of a variety of services (e.g., relational databases) in connection with a data management product (e.g., an SQL database or server). The services or entity to be managed is referred to herein as a target 902 and system 900 should be configured to achieve such goals or management policies that relate to the target 902.

The actual implementation of a policy can be complex because there can be many low-level settings that are each manipulated with distinct semantics. In addition, settings the user may desire to treat together may be exposed in different locations, in different ways, or both. In many cases, the user is compelled to apply a single setting repeatedly on multiple similar objects (e.g., each database uses a particular sort order for character data). A facet 904 can be utilized to bridge the gap between the user's intent and the low-level settings. The facet 904 can be considered a set of logical properties that models a particular dimension of an user intent. A user can create policies against high-level constructs exposed by the facet 904, which can be configured to translate the policies into commands that can be utilized to interrogate or configure the underlying target 902.

Facets can derive from a common interface, such as BaseFacet, which can contain dispatch methods for accessing properties and commit logic. Each facet can define properties, which can be read only or read/write properties. An adapter class can inherit from the BaseFacet interface and can aggregate an underlying object model class. The adapter can utilize the physical properties of the object model class (and other logic) to expose the facet properties.

Target(s) 902 can expose state or metadata through facet(s) 904. For example, a Table can have a state corresponding to its schema metadata (e.g., name, owner, and so on). There is a state corresponding to its physical storage (e.g., partitioning, file groups) and a state corresponding to the data content (e.g., size, number of rows). These can be different facets and each facet of a target type is an interface to specify an intent.

Policies can be statements about the acceptable state of a facet 904, for example. In classic declarative style, policies specify the desired state of a target 902, not how to achieve the desired state. For example, a policy on schema metadata might specify that the name should start with "xy_". These specifications can be defined as constraint(s) 906 on acceptable states (e.g., through simple Boolean expressions over the attributes of the facet 904). Thus, a constraint 906 can be a Boolean function with a single facet parameter, specifying a set of allowed states.

A policy 908 can specify a constraint 906 and its behavior (e.g., the way the constraint 906 is executed). Different policies can be aggregated into composite policies or a policy group 910 (e.g., a single policy might contain all the security requirements for a machine, or an overall server policy might combine a naming policy, a surface-area policy, a data recoverability policy, a space-management policy). Policies can reference other policies.

An individual policy 908 may be explicitly evaluated against a target 902 or set of targets. A policy 908 may be applied to a single object or a collection of objects (e.g., the policy might apply to all the objects of a database). A policy 908 may also be applied across an enterprise (e.g., it might be applied to all the servers in a web farm). Enterprise management is a framework that can simplify and lower the total cost of enterprise system administration where configuration and maintenance policies span multiple heterogeneous server instances (e.g., server farms, federated servers).

The collection of objects subject to a policy 908 is referred to as a target set 912, wherein the target set 912 is a set of managed targets specified by a path expression. The target set 912 consists of all the targets under that path. The association of a policy 908 and a target set 912 is referred to as a policy binding 914, which is an M:M relationship between policies 908 and managed target sets 912. By utilizing target set(s) 912, users can check or configure all their machines with a single action. System 900 can automatically apply a particular policy to a particular set of targets through policy binding. The binding can also specify the type of behavior desired (e.g., checking for violation, changing the target to conform).

A Declarative Management Framework (DMF) allows a user to define and evaluate policies against a set of target objects. For a single policy to be evaluated there should be a state interface defined. The policy can be defined against properties of the state interface and the interface can be implemented by a target object. At the time of policy evaluation, a set of target objects can be materialized and a policy applied to the entire set.

The target objects can be populated with data coming from different sources. Examples are data retrieved through SMO objects or data retrieved through a data collector. The policy can be evaluated on a target set built on data from a data collector and such data should be available from the data collector (e.g., performance data). In some embodiments, the data can be available through other means (e.g. SMO), but it should be collected for the purpose of reporting. The data can be collected on the server and policies can be evaluated on the server. The data can be persisted to a warehouse. This should cover most situations for server-side policy evaluation that should be performed on a pre-defined schedule. When defining a binding for such policies, the user has a choice of specifying policy evaluation as part of data collection.

In cases where policies should be evaluated on the client side (e.g., ad-hoc evaluation) or when policy is triggered by a server event (e.g., event-driven evaluation) and data can be captured through SMO or some other way, the data might not go through a collector and might not be persisted. In addition, if a user decides to turn off a data collector, an ad-hoc or event-driven policy evaluation is available.

At least two types of state interfaces and polices can utilize data from the data collector, namely, a state interface that uses a single data snapshot and a state interface that uses a series of data snapshots. For a state interface that uses a single data snapshot, each row from the single data snapshot represents a single instance of the target object implementing the state interface. An example is an IBackup state interface implemented by a set of backup objects.

For a state interface that uses a series of data snapshots, the series can be retrieved from the data collector cache using a data cache interface. Usually a single instance of a target object implementing a state interface is instantiated for policy evaluation. The complexity of the state is built on the series of data and is hidden behind the interface. An example of such interface can be IHealthModel interface implemented by a server object. The interface provides properties such as NormalizedResponseTime that uses a series of response time measurements normalized to a user-defined baseline.

A policy can be evaluated at various times during data collection. For example, performance-oriented policies might be evaluated at the time of data snapshot to be able to quickly respond to changing server's state. Other polices may be evaluated at the time data is uploaded to the warehouse.

Each data collector package (SSIS package) exposes events at certain points of data flow execution that allow triggering of policy evaluation. Any number of policy bindings can be associated with such an event. When the event occurs, binding information can be retrieved from the binding storage and a binding object is instantiated. Binding is then used to evaluate a policy against a set of target objects. The target objects can be created using an adapter pattern, for example. Each target object is implemented using an adapter class that directly implements the state interface but receives data from data cache of the collector.

Such an approach allows policies defined against state interfaces to be implemented in various ways, depending on how the policy should be evaluated. If the policy runs as part of data collection, one adapter class can be used to obtain the data from collector. If the same policy is ran independently of the collector then another adapter class, implementing the same state interface, can be used and data obtained through other means.

The following illustrates an exemplary resource consumption policy. A CPU run queue can be more than five times the number of CPUs for ten consecutive observations, which is the warning level. The disk queue length can be more than two for ten consecutive observations, which results in a warning level. An SQL server instance CPU utilization percentage should be less than eighty percent of Host CPU (warning level) and less than ninety percent of host CPU, which results in a critical level. There should be less than ten percent of free space in tempdb. The rate of memory sweeps should be increased, which indicates internal memory pressure (physical or virtual).

The following is an exemplary application or workload policy. Normalized response time deviation is greater than two times the standard deviation (e.g., more than ninety-five percent from mean) for five consecutive observations (critical level). Normalized response time can equal the sum of ($W_{i\text{-}Baseline} * (R_{i\text{-}Current}/R_{i\text{-}Baseline})$). $W_{i\text{-}Baseline}$ can be the executions of $i_{th}$ SQL statement or the total number of executions of all SQL statements. $R_{i\text{-}Current}$ is the average response time of $i_{th}$ SQL statement in the baseline. $R_{i\text{-}Current}$ is the average response time of $i_{th}$ SQL statement executing currently.

Statistically significant deviation in response time components, such as CPU, I/O, contention etc. that is more than two times the standard deviation can be included in an exemplary application or workload policy. Also, an SQL statement's normalized response time deviation can be more than two times the standard deviation (e.g., more than ninety-five percent from mean) for five consecutive observations (warning level).

In addition, an application or workload policy can include that if there is more than a twenty-five percent increase/decrease in load, throughput and other metrics for the application or workload the following can apply. An increase in number of concurrent logins, an increase in login rate (e.g., number of logins per second), or an increase in number of total requests. The following can also apply, a decrease in total size of committed transactions (e.g. total size of committed transactions is equal the number of transactions times the average size of each transaction). The policy can also include that there can be an increase in sort pages, an increase in work table, an increase in amount of row versioning data generates, an increase in number of non-unique SQL statements that could have used bind parameters (e.g., they would have been unique if bind parameters had been used). The policy can also provided that there can be an increase in number of compiles/recompiles, an increase in rate of number of deadlocks, an increase in number of pages for logical reads, and an increase in number of pages for logical writes.

An exemplary cursor usage policy can specify, for example, that rows returned per fetch are less then one hundred for multi-fetch statements. Other policies can include keeping log files on a separate physical disk than data files for better performance, to have a minimum number of rows fetched per fetch. Policies can relate to input/output (I/O) bottleneck (pageiolatch waits) or CPU usage (e.g., excessive compiles/recompiles causing CPU consumption, excessive usage by SQL execution, excessive logins), excessive blocking (e.g. locks), and/or deadlocks.

A Data Collector Runtime API can be an interface for controlling the collections, such as starting or stopping the collections and enumerating running collections. A Data Collector Data Cache API can be an interface to obtain the cached stream of data for a particular collection. A Data Collector Configuration Storage API can be an interface for adding and removing collection sets and collection templates, applying collection sets to the Management Targets. Data Collector Management Objects can be an SMO-based object model to manage all aspects of Data Collector. This object model utilizes APIs exposed from data collector and allows a client application to access them.

Figure 10:
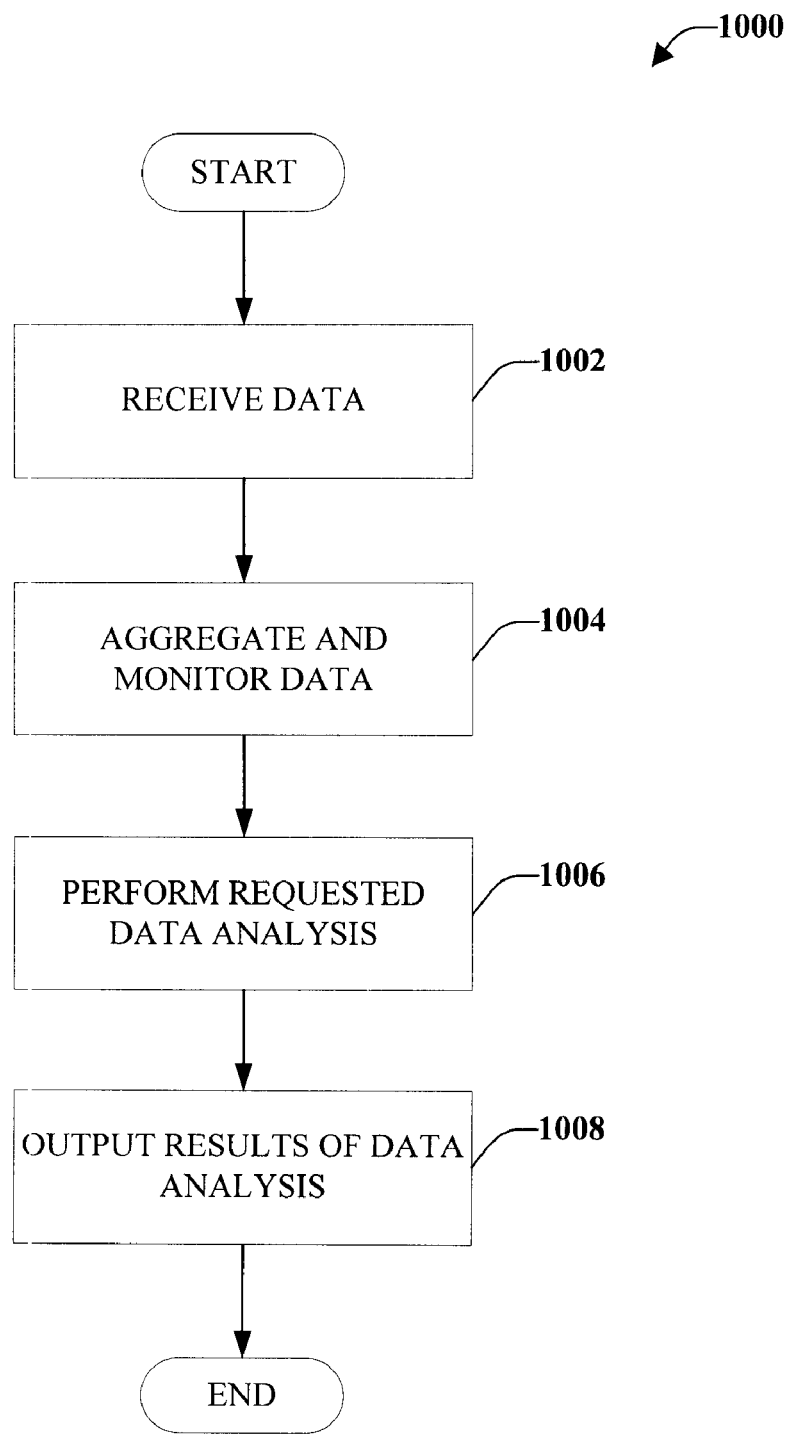
FIG. 10 illustrates a methodology for data collection.

In view of the exemplary systems shown and described above, FIG. 10 illustrates a methodology 1000 for data collection. While, for purposes of simplicity of explanation, the methodology is shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Method 1000 starts, at 1002, with receipt of at least two data inputs. Such data can be received directly from a user and/or entity, such as a computer or machine from which data should be collected. A user may input data directly, such as through a user interface, or the user can be prompted for various data. For example, a user may input information relating to targets, policies, or goals that should be monitored against other data to determine compliance to such targets, policies or goals. The collected data can be dynamically varying data that might be of benefit to a single user or a multitude of users that might not be able to obtain such data utilizing conventional methods. The data received, at 1002, can also be one or more management targets.

At 1004, the data is aggregated and monitored either continuously (based on defined criteria) or for a one-time ad-hoc data collection and monitoring. Ad-hoc data collection can be to monitor for specific data or a specific event. The data can be retained (either temporarily or permanently) in a retrievable format. For example, the data can be retained in a data collector that includes a storage media or other means for maintaining the received data.

Data analysis is performed, at 1006, which can be requested by the user or performed autonomously, such as when a deviation from a stated target is discovered. Data analysis can include troubleshooting or policing instances of data management product services, such as targets, goals, or policies. Analysis can also include automated sampling and aggregation of performance or other varying data. Results of the data analysis can be output to the user or a multitude of users, at 1008. The output can also be stored for historical monitoring and reporting purposes.

Another type of analysis can include comparing the data inputs to a management target. A determination can be made whether the data inputs conform to the target or not. This information can be presented to the user and further action can be taken, such as changing the data inputs, changing the target, or other modifications.

Figure 11:
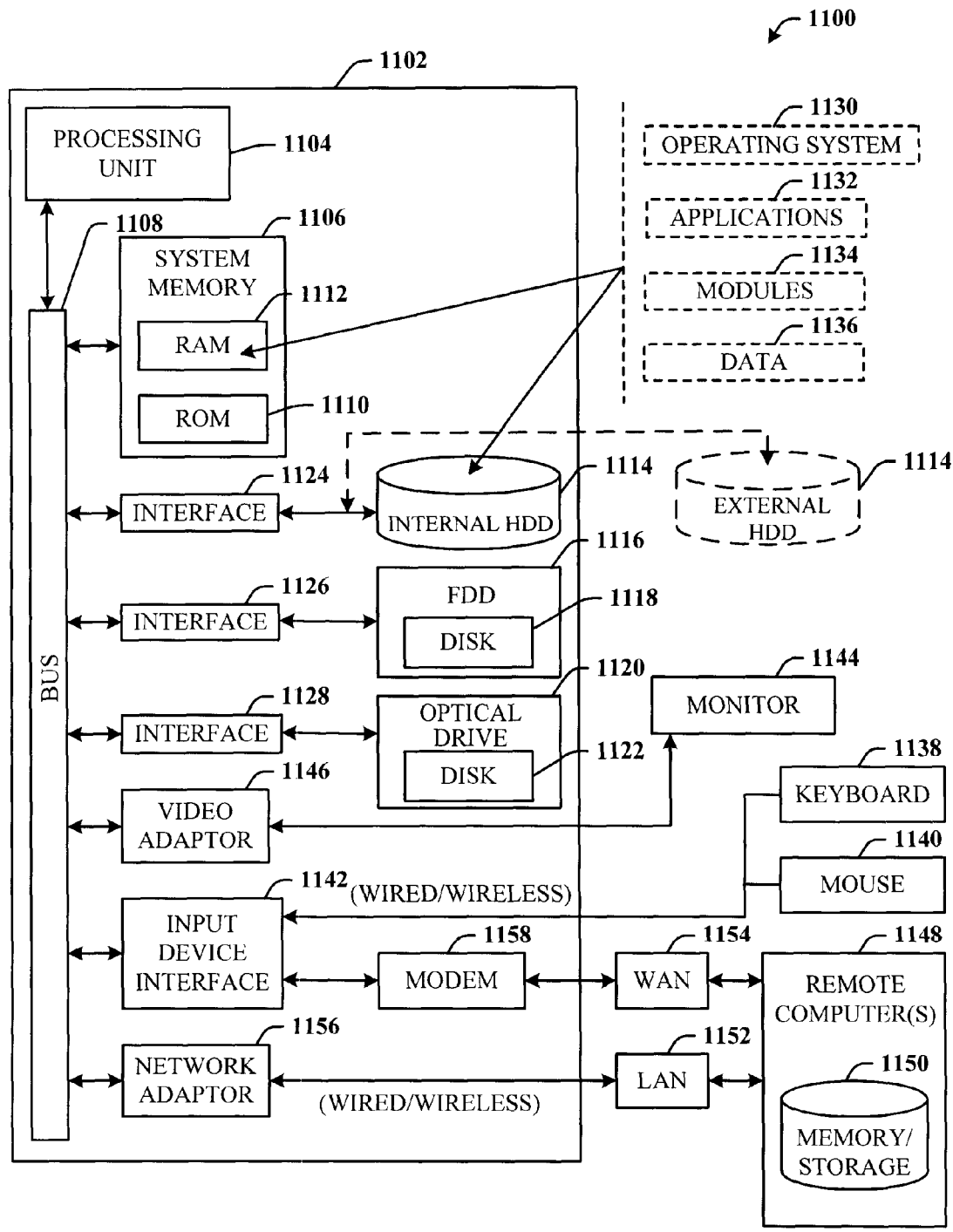
FIG. 11 illustrates a block diagram of a computer operable to execute the disclosed embodiments.

Referring now to FIG. 11, there is illustrated a block diagram of a computer operable to execute the disclosed architecture. In order to provide additional context for various aspects disclosed herein, FIG. 11 and the following discussion are intended to provide a brief, general description of a suitable computing environment 1100 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the various embodiments can be implemented with various commercially available operating systems or combinations of operating systems.

A user can enter commands and information into the computer 1102 through one or more wired/wireless input devices, e.g. a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc. . . . .

A monitor 1144 or other type of display device is also connected to the system bus 1108 through an interface, such as a video adapter 1146. In addition to the monitor 1144, a computer typically includes other peripheral output devices (not shown), such as speakers, printers, etc. . . . .

The computer 1102 may operate in a networked environment using logical connections through wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g. a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
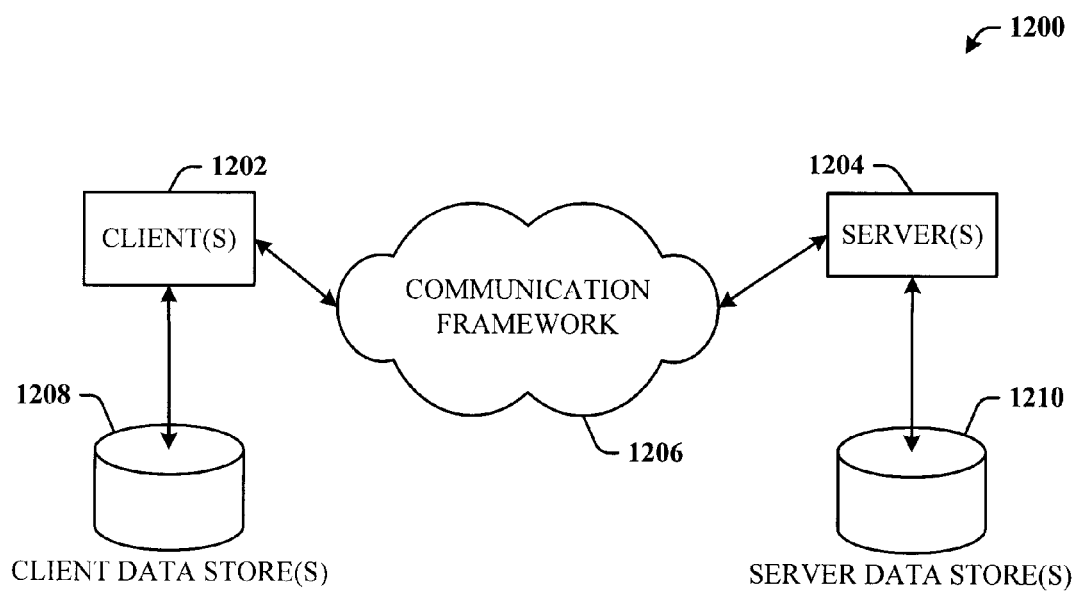
FIG. 12 illustrates a schematic block diagram of an exemplary computing environment operable to execute the disclosed embodiments.

Referring now to FIG. 12, there is illustrated a schematic block diagram of an exemplary computing environment 1200 in accordance with the various embodiments. The system 1200 includes one or more client(s) 1202. The client(s) 1202 can be hardware and/or software (e.g. threads, processes, computing devices). The client(s) 1202 can house cookie(s) and/or associated contextual information by employing the various embodiments, for example.

The system 1200 also includes one or more server(s) 1204. The server(s) 1204 can also be hardware and/or software (e.g., threads, processes, computing devices). The servers 1204 can house threads to perform transformations by employing the various embodiments, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated through a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

Various embodiments have been presented in terms of systems that may include a number of components, modules, and the like. It is to be understood and appreciated that the various systems may include additional (or may not include all of) the components, modules, and the like discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

What is claimed is:

1. A computer system that facilitates performance data collection, comprising:
   one or more processors;
   a memory storage unit;
   one or more computer storage media having stored thereon:
      a component that accepts at least two inputs from different versions of an operating system, a first of the at least two inputs having data corresponding to a first version of a first target type of operating system, a second of the at least two inputs having data corresponding to a different, second version of the first target type of operating system;
      a collection component that samples and aggregates together data from the at least two inputs according to an algorithm defined by a consolidated collection definition stored on the memory storage unit, the consolidated collection definition created from binding a first program module template defining a first algorithm to collect data corresponding to the first version of the first target type and a second program module template defining a second algorithm to collect data corresponding to the second version of the first target type, the first program module template including a first collection set, the second program module template including a second collection set;

wherein the first collection set includes a first collection item that binds a first collection class to a first plurality of data points to be collected from targets of the first version of the first target type, the first collection class including:
a first field points to the first target type;
a second field points to a first package configured to collect the first plurality of data points from the targets of the first version of the first target type; and
a third field points to a second package configured to transform and load the data collected by the first package into a performance warehouse; and wherein the second collection set includes a second collection item that binds a second collection class to a second plurality of data points to be collected from targets of the second version of the first target type, the second collection class including:
a first field points to the first target type;
a second field points to a third package configured to collect the second plurality of data points from the targets of the second version of the first target type; and
a third field points to a fourth package configured to transform and load the data collected by the third package into the performance warehouse; and an output component that displays the sampled and the aggregated data from the at least two inputs.

2. The system of claim 1, wherein the collection component monitors zero or more management targets and compares the management targets to the at least two inputs.

3. The system of claim 1, wherein the collection component is hosted in a service that provides scheduling capabilities.

4. The system of claim 1, wherein the at least two inputs are dynamically varying data.

5. The system of claim 1, wherein the collection component continuously monitors a plurality of inputs.

6. The system of claim 1, wherein the collection component monitors a plurality of inputs on a one-time ad-hoc basis.

7. The system of claim 1, wherein the collection component is a dedicated machine component.

8. The system of claim 1, further comprising a second collection component that samples and aggregates together data from the at least two inputs.

9. The system of claim 1, wherein the collection component stores information on a remote relational engine.

10. The system of claim 1, further comprising a machine learning component that automates at least one function of the collection component.

11. A method for data collection performed by a computer system including one or more processors and one or more memory storage units, comprising:
obtaining a first and a second data input, the first data input having data corresponding to a first version of a first target type of operating system, the second data input having data corresponding to a different, second version of the first target type of operating system;
aggregating together data corresponding to the first and second data inputs according to an algorithm defined by a consolidated collection definition stored on a memory storage unit, the consolidated collection definition created from binding a first program module template defining a first algorithm to collect data corresponding to the first version of the first target type and a second program module template defining a second algorithm to collect data corresponding to the second version of the first target type, the first program module template including a first collection set, the second program module template including a second collection set;
wherein the first collection set includes a first collection item that binds a first collection class to a first plurality of data points to be collected from targets of the first version of the first target type, the first collection class including:
a first field points to the first target type;
a second field points to a first package configured to collect the first plurality of data points from the targets of the first version of the first target type; and
a third field points to a second package configured to transform and load the data collected by the first package into a performance warehouse; and
wherein the second collection set includes a second collection item that binds a second collection class to a second plurality of data points to be collected from targets of the second version of the first target type, the second collection class including:
a first field points to the first target type;
a second field points to a third package configured to collect the second plurality of data points from the targets of the second version of the first target type; and
a third field points to a fourth package configured to transform and load the data collected by the third package into the performance warehouse; and
providing the aggregated data corresponding to the data inputs to a user.

12. The method of claim 11, further comprising storing the aggregated data corresponding to the data inputs for historical analysis.

13. The method of claim 12, wherein the aggregated data corresponding to the data inputs are stored in a remote location.

14. The method of claim 11, further comprising:
receiving a management target,
comparing the first and second data inputs to the received management target; and
providing the comparison to a user.

15. The method of claim 11, wherein aggregating data corresponding to the first and second data inputs is performed upon a user request.

16. The method of claim 11, wherein aggregating data corresponding to the first and second data inputs is performed continuously.

17. The method of claim 11, wherein the first and second data inputs are dynamically varying data.

18. A computer system that facilitates performance data collection, comprising:
one or more processors;
a memory storage unit; and
one or more computer storage media having stored thereon computer-executable instructions for performing a method, the method including:

obtaining a first and a second data input, the first data input having data corresponding to a first version of a first target type of operating system, the second data input having data corresponding to a different, second version of the first target type of operating system;

aggregating together data corresponding to the first and second data inputs according to an algorithm defined by a consolidated collection definition stored on a memory storage unit, the consolidated collection definition created from binding a first program module template defining a first algorithm to collect data corresponding to the first version of the first target type and a second program module template defining a second algorithm to collect data corresponding to the second version of the first target type, the first program module template including a first collection set, the second program module template including a second collection set;

wherein the first collection set includes a first collection item that binds a first collection class to a first plurality of data points to be collected from targets of the first version of the first target type, the first collection class including:

a first field points to the first target type;

a second field points to a first package configured to collect the first plurality of data points from the targets of the first version of the first target type; and a third field points to a second package configured to transform and load the data collected by the first package into a performance warehouse; and wherein the second collection set includes a second collection item that binds a second collection class to a second plurality of data points to be collected from targets of the second version of the first target type, the second collection class including:

a first field points to the first target type;

a second field points to a third package configured to collect the second plurality of data points from the targets of the second version of the first target type; and a third field points to a fourth package configured to transform and load the data collected by the third package into the performance warehouse; and providing the aggregated data corresponding to the data inputs to a user.

19. The system of claim 18, further comprising:

prior to aggregating together the data corresponding to the first and second data inputs, automatically discovering one or more targets of the first target type that are present in a system to be tested; and prior to aggregating together the data corresponding to the first and second data inputs, automatically generating the consolidated collection definition in response to discovering that one or more targets of the first target type are present in the system to be tested.

* * * * *